Dec. 26, 1961

R. F. REIFERS 3,014,752

EGG LIFTER

Filed Aug. 5, 1958

INVENTOR
Richard F. Reifers

BY Karl W. Flocks
ATTORNEY

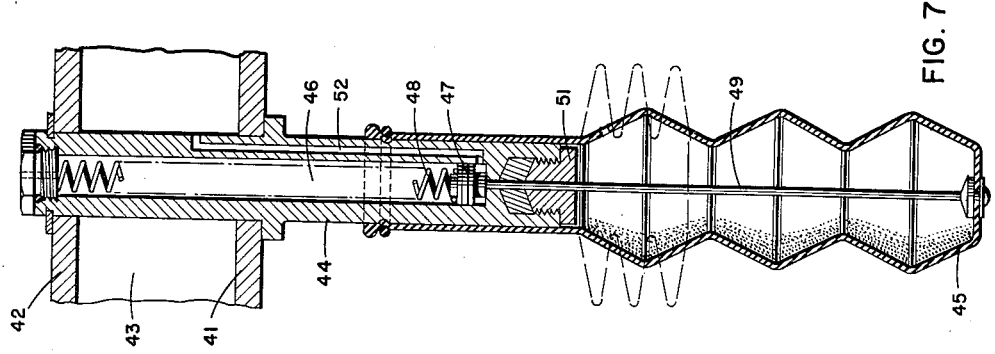
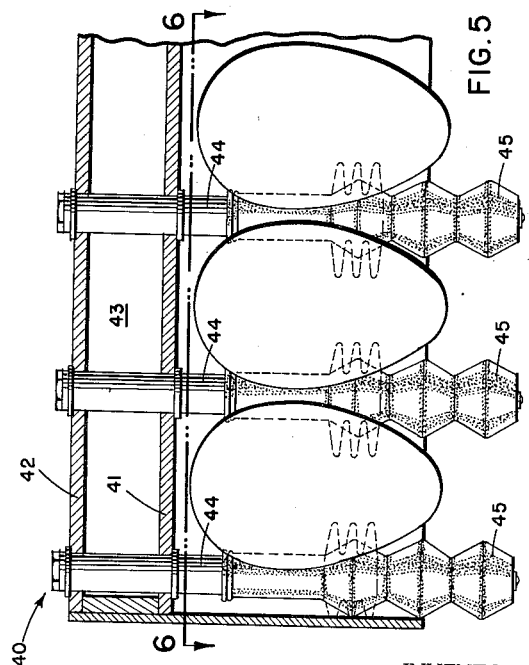
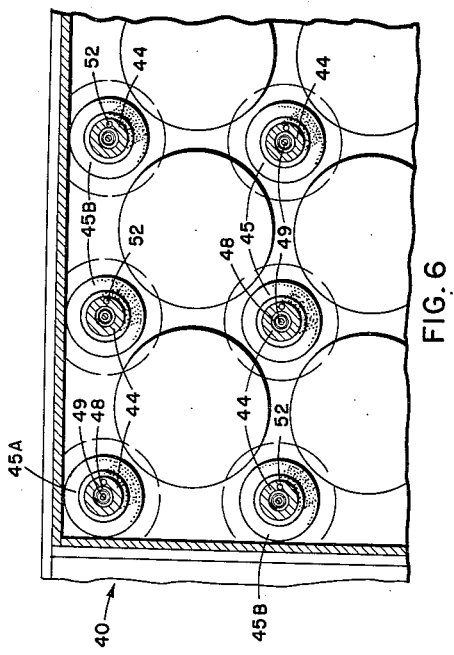

United States Patent Office 3,014,752
Patented Dec. 26, 1961

3,014,752
EGG LIFTER
Richard F. Reifers, Stamford, Conn., assignor to Diamond National Corporation, a corporation of Delaware
Filed Aug. 5, 1958, Ser. No. 753,336
4 Claims. (Cl. 294—87)

The present invention relates to egg lifting devices, and more particularly to such devices for lifting a plurality of eggs and in which the eggs are gripped by gentle and soft gripping members that are caused to expand to grip the eggs.

The present application is a continuation-in-part of my co-pending application Serial No. 698,431, filed November 25, 1957 for "Egg Lifter."

As was pointed out in said application, eggs are received in modern egg candling and packing rooms in cases in which they are disposed in layers of three dozen eggs each, the eggs being arranged in six rows of six eggs. It is necessary that the eggs be removed from these cases quickly and without breakage, and to this end before the advent of the present invention, egg lifters were used in which a pair of fingers were caused to move by mechanical linkage to engage each of the eggs.

The present invention provides an egg lifter in which soft gripping members are caused to expand to grip the eggs and thus to lift them from the egg case.

It is an object of the present invention to provide an egg lifter having improved gripping members.

Another object of the present invention is the provision of an egg lifter with improved gripping members that are shaped to conform to the opening between eggs positioned in an egg case.

A further object of the present invention is to provide an egg lifter in which gripping members enter between eggs positioned in an egg case facilely and expand a limited amount.

Yet another object of the present invention is the provision of an egg lifter that is at least partially mechanically operated and has soft and yielding gripping members.

It is another object of the present invention to provide an egg lifter in which the eggs are lifted by being subjected to a small amount of force that is distributed over a relatively large surface of the egg to thereby provide a minimum of presure at any point on the egg.

Other objects and the nature and advantages of the instant invention will be apparent from the following description taken in conjunction with the accompanying drawings, wherein:

FIG. 5 is a view similar to FIG. 1 and showing a still further embodiment of the present invention.

FIG. 6 is a cross-sectional view taken on the line 6—6 of FIG. 5.

FIG. 7 is an elevational view, to an enlarged scale, and with parts in sections of a gripping member of the embodiment shown in FIG. 5.

Figure 1:
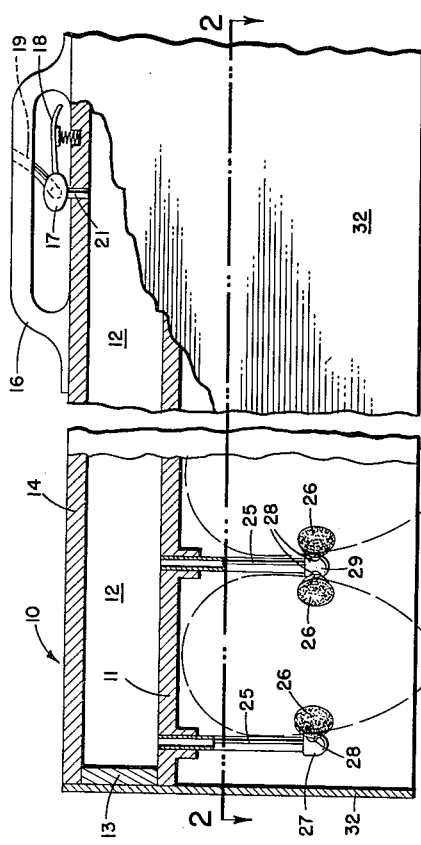
FIG. 1 is an elevational view, partly in section with parts broken away and showing an embodiment of the present invention.

Referring now to the drawings, wherein like reference characters are used to designate like or corresponding parts throughout the several views, there is shown in FIG. 1 an egg lifter 10 having a support 11. Support 11 is generally planular and has a plenum chamber 12 thereabove formed by the support 11, side walls 13 and an upper plate 14. Attached to the upper plate 14 is a handle 16 beneath which is positioned a valve 17 having a lever 18. A flexible air conduit 19 is connected with the valve 17 and a pipe 21 serves to support the valve 17 and extends through the upper plate 14 to communicate with the plenum chamber 12.

Extending downwardly from the support 11 are a plurality of tubes 25, these tubes supporting one or more expansible members 26.

It will be understood that the device 10 is square in horizontal cross-section, so as to fit into one of the open compartments of an egg case. The eggs in the egg case are placed in six rows of six each, and the tubes 25 and expansible members 26 are placed in proper position and number to properly engage the eggs. Thus, there are forty-nine of the tubes 25 arranged in seven rows of seven tubes each. Furthermore, there are three groups of tubes 25 and expansible members 26, as will be explained. In FIG. 5, there may be seen one tube of the first group in the corner of the device 10. This first group comprises only the four tubes positioned in the four corners of the device, and the tubes of this first group each has a fitting 27 on the lower end thereof from which extends a single nipple 28. Nipple 28 is directed generally along a diagonal of the square defined by the support 11. On nipple 28 there is secured the expansible member 26, member 26 having a mouth and a relatively large and substantially flat wall extending generally perpendicularly to the axis of the mouth. The mouth of the expansible member 26 is placed over and embracingly engages the nipple 28.

A second set of tubes 25 comprises all of the members of the exterior rows of the device excepting the members in the first set, i.e., the corner members. Each of the members of the second set has a fitting 29 at its lower end, fitting 29 having two nipples 28 extending therefrom generally parallel to the diagonals of the square defined by the support 11. Each of the nipples 28 has thereon an expansible member 24.

The third set of tubes 25 comprises all of the tubes 25 in the interior of the device, and each of these has a fitting 31 at its lower end having four nipples 28 extending therefrom, also on axes generally parallel to the above noted diagonals. Each of the nipples 28 on the fittings 31 has an expansible member 26 thereon.

It will be seen from the above that the majority of the egg engaging members, which comprise the tubes 25 and the expansible members 26, are of a generally cruciform shape when viewed in a plane parallel to the plane of support 11.

When it is desired to lift eggs from an egg case with the device 10, it is grasped by the handle 16 and lowered into the egg case, the peripheral wall 32 which extends from the upper plate 14 and support 11 serving as a guide. As the device 10 is lowered, the expansible members 26 are in their deflated condition and enter into the spaces between the eggs and between the eggs and the walls of the egg case as is shown in the full line representation in FIG. 2. After the device 10 has been lowered sufficiently, the lever 18 is depressed, thus admitting air into the plenum chamber 12 and from thence through the tubes 25 and into the expansible members 24, thus causing them to expand and to enter into engagement with the eggs. The device 10, with the thirty-six eggs, is then lifted and placed down at any desired point such as on a conveyor of an egg candling machine. Upon further movement of the lever 18, the air will be permitted to escape from the expansible members 26 and thus they will return to their retracted or unexpanded state.

Figure 3:
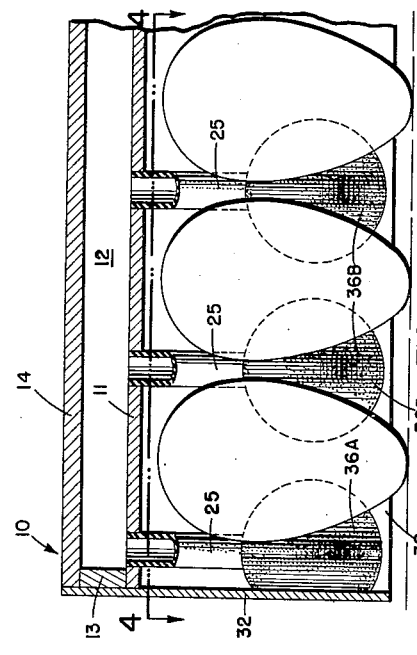
FIG. 3 is a view similar to FIG. 1 and showing another embodiment of the present invention.
Figure 4:
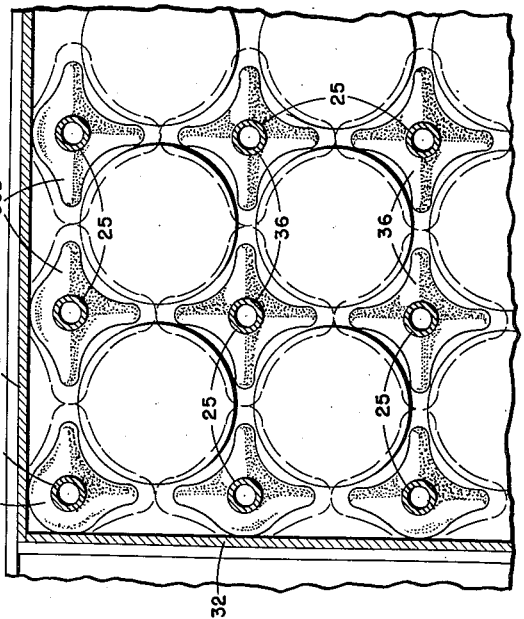
FIG. 4 is a cross-sectional view taken on the line 4—4 of FIG. 3.
Figure 2:
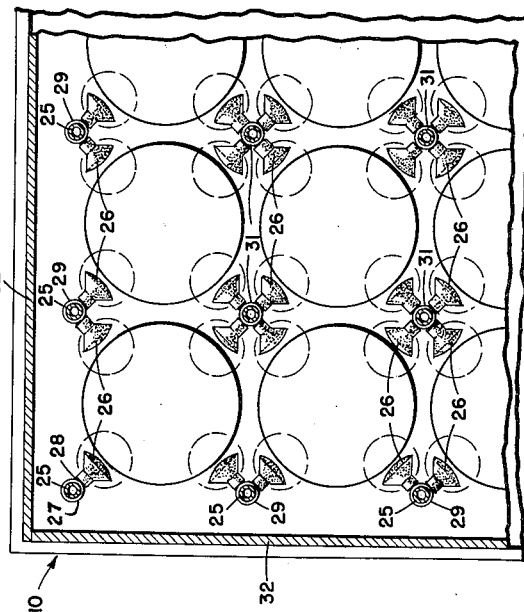
FIG. 2 is a cross-sectional view taken on the lines 2—2 of FIG. 1.

The embodiment shown in FIGS. 3 and 4 is generally similar to that shown in FIGS. 1 and 2, and may be seen to comprise the support 11, the plenum chamber 12, the upper plate 14, the peripheral wall 32 and the depending tubes 25. However, instead of the fittings, nipples and expansible members 26, there is provided an expansible member 36 that is attached directly to the tubes 25. As is best seen in FIG. 4, the expansible members 36 that are in the interior of the device are generally cruciform in cross section in a plane parallel to the plane of support 11. The corner members 36A and the side members 36B are modified slightly from the cruciform shape of the expansible members 36 to provide a gentle expansion thereof.

As will be understood, the members 36 may be of a generally cruciform shape, as above described and several variants of this shape are possible, two having been illustrated in FIG. 4. It may be seen therefrom that some of the members 36 are of a generally bulbous cruciform shape whereas others are of a somewhat sharper and more well defined cruciform shape.

In operation, the device is lowered into an egg case as with the device of FIGS. 1 and 2 and the expansible members descend into the spaces between the eggs. Thereafter, air is admitted to the expansible members and they are caused thereby to expand to the shape shown in dotted lines in FIG. 4, thus to gently engage the eggs and to retain them during the lifting thereof.

In FIG. 5 there is shown a lifting device 40 having a support 41 and an upper plate 42 parallel to it. The egg engaging members are in the form of undulated sleeves 45 that are movable from the extended position shown in full lines to the contracted and laterally extended position shown in dotted lines.

Referring to FIG. 7, it may be seen that between the support 41 and upper plate 42 is a plenum chamber 43. Support 41 has a plurality of tubes 44 extending therefrom one of which is shown in FIG. 7. Embracingly engaging the tube 44 is the aforementioned sleeve 45. The upper end of sleeve 44 comprises a cylinder 46 having a piston 47 therein that is urged downwardly by the spring 48. A piston rod 49 extends downwardly through a head 51 of cylinder 46 and the lower end thereof is connected with the lower end of sleeve 45. It will be understood that the upper end of the sleeve 45 is open and that it is by this means that it engages the tube 44. A port 52 serves to communicate the plenum chamber 43 with the under side of the piston 47.

In operation, the device 40 is handled as before mentioned. When it is desired to lift eggs, the plenum chamber 43 is supplied with air which passes through the various ports 52 of the tubes 44 and causes the pistons 47 thereof to rise upwardly against the urging of spring 48. This causes the piston rod 49 to translate axially and because of its connection with the lower end of the sleeve 45, the sleeve 45 is contracted axially while the lateral dimension thereof is increased to thus engage in a yielding and gentle manner the eggs in the egg case. When the air in the plenum chamber is released the springs 48 urge the pistons 47 downwardly and through the action of the piston rods 49 the sleeves 45 are returned to their extended position.

It is to be understood that the corner and side sleeves 45A and 45B, shown in FIG. 6 may be made of a configuration that is other than circular in horizontal cross section, as is seen therein. Also, it will be understood that the operating piston rod 49 may be moved by other means than that shown, although the apparatus shown in FIG. 7 is the preferred means for moving the operator rod 49.

It will be seen that there has been provided a readily handled egg lifting device that has egg engaging members that may be caused to gently engage the eggs and that will also enter into the spaces between the eggs in an egg case easily. There has also been provided an egg lifter in which at least part of the movement thereof is mechanical while still providing a gentle contacting and lifting of the egg.

It will be obvious to those skilled in the art that various changes may be made without departing from the spirit of the invention and therefore the invention is not limited to what is shown in the drawings and described in the specification but only as indicated in the appended claims.

What is claimed is:

1. A lifting device for eggs comprising a generally planar support, spaced tubes each having one end secured to said support and extending from one face thereof, each tube being spaced from the closest tube thereto a distance at least as great as the greatest diameter of the eggs to be lifted, an inflatable element secured to the other end of each of said tubes and in fluid communication therewith, said inflatable elements located to make contact with at least one egg and with at least one point of contact, between each of said inflatable elements and an adjacent egg, located in a horizontal plane below the largest horizontal planar cross-section of the egg, whereby said inflatable elements provide a support means for the eggs within said device.

2. The lifting device of claim 1, further characterized by said inflatable elements being of cruciform configuration in a plane parallel to the plane of said support.

3. The lifting device of claim 1, further characterized by each of said tubes having four oppositely extending nipples thereon, each of said nipples fluidly connecting one of said inflatable elements to said tubes.

4. The lifting device of claim 1, further characterized by said support being a square, and each of said tubes at each corner thereof supporting one of said inflatable elements which extends along a diagonal of said square, each of said tubes along the sides of said support supporting two of said inflatable elements which extend inwardly into the device with each of said inflatable elements parallel to one of the diagonals of said square support, and each of said tubes located interiorly of the device supporting four inflatable elements extending in a cruciform manner with each of the adjacent inflatable elements parallel to a different diagonal of said square support.

References Cited in the file of this patent

UNITED STATES PATENTS

| 2,611,612 | Schmidt | Sept. 23, 1952 |
| 2,784,997 | Baumann | Mar. 12, 1957 |
| 2,840,415 | Morris | June 24, 1958 |

FOREIGN PATENTS

| 713,770 | Great Britain | Aug. 18, 1954 |